United States Patent
Karussi

(10) Patent No.: US 6,435,875 B1
(45) Date of Patent: Aug. 20, 2002

(54) ELECTRONIC BULLDOZER GAME

(75) Inventor: Kurt Karussi, Hermosa Beach, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/782,541

(22) Filed: Feb. 12, 2001

(51) Int. Cl.[7] .......................... G09B 9/02; G09B 19/16
(52) U.S. Cl. ...................... 434/29; 434/62; 434/365; 463/7; 463/38; 273/442; 273/461
(58) Field of Search ................ 434/45, 55, 61, 434/62, 69, 29, 307 R, 308, 365; 463/2, 6, 7, 34–39, 50–53, 57; 273/441, 442, 454, 461; 446/7, 26, 143, 175, 230, 246, 330, 359, 433; 345/156, 157, 473

(56) References Cited

U.S. PATENT DOCUMENTS

| | | | |
|---|---|---|---|
| 3,849,931 A | | 11/1974 | Gulley, Jr. et al. |
| 3,993,309 A | | 11/1976 | Morris et al. |
| 4,231,571 A | * | 11/1980 | Watanabe ................. 273/442 |
| 4,288,943 A | * | 9/1981 | Ptaszek et al. .............. 446/7 |
| D261,787 S | | 11/1981 | Breneman |
| 4,373,722 A | * | 2/1983 | Kite et al. ................... 463/6 |
| 4,536,164 A | | 8/1985 | Klawitter |
| 4,589,660 A | * | 5/1986 | Tsuzuki ..................... 273/442 |
| 4,602,790 A | | 7/1986 | Furukawa |
| 4,659,313 A | | 4/1987 | Kuster et al. |
| 4,709,917 A | * | 12/1987 | Yang ............................ 434/61 |
| 4,856,777 A | | 8/1989 | Hirose et al. |
| 4,895,376 A | * | 1/1990 | Shiung-Fei ................... 463/2 |
| 4,976,429 A | | 12/1990 | Nagel |
| D316,879 S | | 5/1991 | Shulman et al. |
| 5,106,102 A | | 4/1992 | Mitsumoto |
| 5,127,658 A | * | 7/1992 | Openiano .................. 463/50 |
| 5,213,327 A | | 5/1993 | Kitaue |
| 5,344,354 A | * | 9/1994 | Wiley ........................... 446/7 |
| D355,446 S | | 2/1995 | Sahler |
| 5,611,731 A | * | 3/1997 | Bouton et al. ............. 463/37 |
| 5,692,956 A | * | 12/1997 | Rifkin ....................... 463/37 |
| 5,704,837 A | * | 1/1998 | Iwasaki et al. ............ 463/38 |
| 5,794,936 A | | 8/1998 | Kakizaki |
| D399,886 S | | 10/1998 | Brase et al. |
| 5,919,092 A | | 7/1999 | Yokoi et al. |
| 5,967,898 A | * | 10/1999 | Takasaka et al. .......... 463/37 |
| 6,200,219 B1 | * | 3/2001 | Rudell et al. .............. 463/37 |

* cited by examiner

*Primary Examiner*—Joe H. Cheng
(74) *Attorney, Agent, or Firm*—Roy A. Ekstrand

(57) ABSTRACT

An electronic game includes a housing supporting a pair of handles and a pivotable turn table. A model bulldozer is supported upon the turntable while each handle supports a moveable squeeze activated control lever. A liquid crystal display is positioned upon the housing and includes a miniature bulldozer image element together with a scrolling background image set. A microprocessor control circuit within the game unit responds to the actuation of the control levers to scroll the image display appropriately. A mechanical linkage mechanism coupled to the turntable is operated by the control levers to appropriately pivot the turntable and model bulldozer thereon to further simulate steering of the bulldozer.

1 Claim, 4 Drawing Sheets

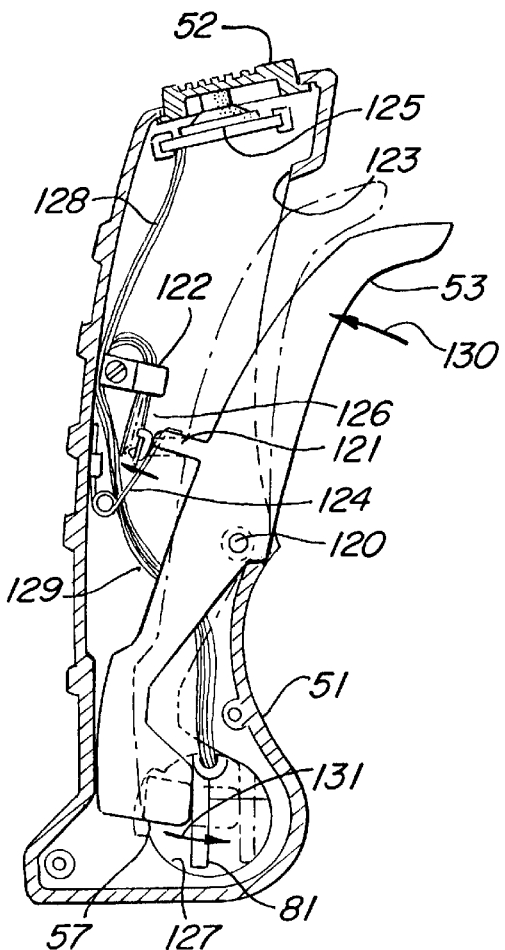
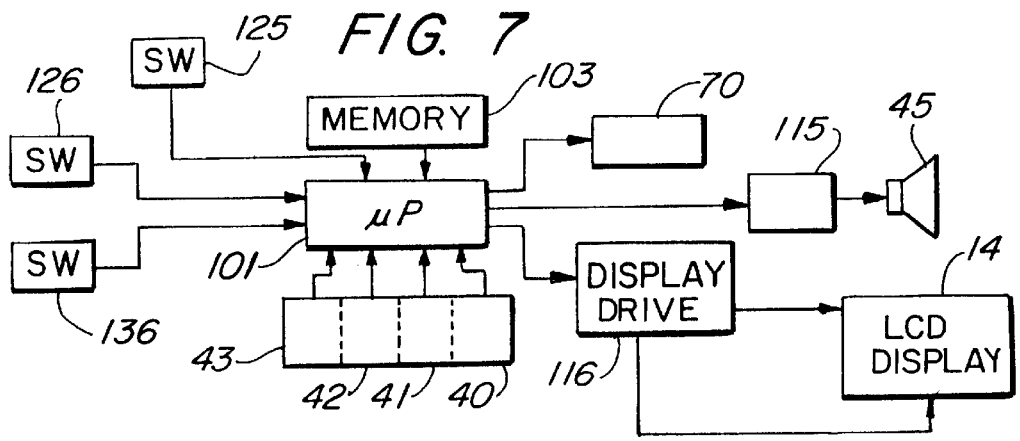

ELECTRONIC BULLDOZER GAME

FIELD OF THE INVENTION

This invention relates generally to stand-alone or handheld games and particularly to those utilizing a display screen.

BACKGROUND OF THE INVENTION

Game apparatus which provide a stand-alone or handheld capability are well known in the art. Such games are known for their capability of performing without additional apparatus such as a computer or television display. In such games, a housing supports a plurality of controls which provide user inputs to the game. In addition, a display screen often formed of a liquid crystal display (LCD) provides a series of images or a moving or scrolling image. Such games have been provided in a virtually endless variety with many games replicating activities such as racing, skiing, motor boating and other vehicle or movement type games. The advent of low-cost powerful microprocessors has facilitated the inclusion of sufficient software within the game. to provide a display movement and image capability which approaches that of video games in its game play potential.

Not surprisingly, the extended popularity of handheld game type apparatus has prompted practitioner's in the art to provide a virtually endless variety of such games having display capabilities. For example, U.S. Pat. No. 5,106,102 issued to Mitsumoto sets forth a PROJECTED IMAGE DRIVE GAME DEVICE having a housing supporting a dashboard-like environment including a steering wheel, a gear shift and a plurality of different controls typical of a motor vehicle. The housing further supports side view mirrors and a display. In front of the display a small model vehicle is pivotally mounted. A transparent running sheet is moveably mounted above a screen supported in proximity to the model. A light source is mounted above the transparent running screen for projecting an image on the screen corresponding to a portion of a pattern such as a road or the like. An electric motor is operative to move the transparent screen in response to the amount of steering wheel manipulation.

U.S. Pat. No. 4,602,790 issued to Furukawa sets forth a TOY ARCADE TARGET GAME having a housing with a hollow drum mounted therein. A transparent indicia strip is mounted upon the drum. A spring is located in front of the drum and a light is positioned within the interior of the drum such that the light illuminates the indicia strip of the image of the strip upon the screen. The light is connected to a handle which is controlled by the operator whereby the image of the indicia is moved across the screen depending upon operator movement of the handle.

U.S. Pat. No. 4,536,164 issued to Klawitter sets forth a TOY COMPUTER BUSY BOX ASSEMBLY having a housing resembling a computer. A plurality of hand manipulated actuating members within the normal keyboard location of a computer are connected to image producing members through systems of gears and levers. A screen section produces an image having the moveable screen members displayed thereon.

U.S. Pat. No. 5,213,327 issued to Kitue set forth a GAME APPARATUS for use with a hand holdable video game device of the type having a video display screen. One or more control buttons and at least one multi-position operating game control for playing the game are provided. The game apparatus also includes a magnifying lens overlying the display screen.

U.S. Pat. No. 3,993,309 issued to Morris et al. sets forth a GAME APPARATUS UTILIZING A DISPLAY SCREEN for simulating the game of table tennis. The display screen is arranged such that a game may be simulated thereon in which two players appear to hit a ball back and forth on the screen. The game includes a serve button for initiating a serve at the beginning of the game. The players continue to ▌volley▌ the simulated ball back and forth by timely actuation of two volleying buttons until a miss is detected.

U.S. Pat. No. 5,794,936 issued to Kakizaki sets forth a GAME APPARATUS having a housing upon which a play surface supports a scrolling endless belt upon which a roadway or pathway is depicted. The housing further supports a model toy vehicle which is operatively coupled to a steering wheel control. As the endless belt moves the pathway beneath the vehicle, the user moves the toy vehicle laterally attempting to follow the pathway by skillful manipulation of the steering wheel.

U.S. Pat. Des. No. 355,446 issued to Sahler and U.S. Pat. Des. No. 399,886 issued to Brase et al. set forth designs for handheld games supporting an image screen.

In related arts, a number of control devices for use in electronic games have also been provided. For example, U.S. Pat. Des No. 316,879 issued to Shulman et al. sets forth a design for a joystick to be used in electronic games.

U.S. Pat. No. 5,919,092 issued to Yokoi et al. sets forth a MANIPULATOR FOR GAME MACHINE having a housing supporting left and right handles each having grips formed thereon. Direction instructing switches are provided for instructing movement direction of characters. The switches are disposed in the thumb position areas of the hand grips.

U.S. Pat. No. 4,976,429 issued to Nagel set forth a HAND-HELD VIDEO GAME IMAGE-PROJECTING AND CONTROL APPARATUS for operatively receiving an interactive electronic video game module. A housing formed of a central body and a pair of side mounted, outwardly extending arms are grasped by a user. Illuminating elements within the housing project images from a substantially transparent screen of the video game module on to a remote viewing and display surface.

U.S. Pat. No. 4,856,777 issued to Hirose et al. sets forth a SIMULATOR TOY having a projection light source and plate supporting projectable images thereon. When the plate is rotated, the image simulates a moving street. A projectable car is moveable under the rotation plate by moving a knob. The player uses the turning knob to manipulate the car around the projected objects.

U.S. Pat. No. 4,659,313 issued to Kuster et al. sets forth a CONTROL YOKE APPARATUS FOR COMPUTERIZED AIRCRAFT SIMULATION having a housing supporting an aircraft type steering wheel control which is operatively coupled to a video display unit.

U.S. Pat. Des. No. 261,787 issued to Breneman and U.S. Pat. No. 3,849,931 issued to Gulley, Jr. each set forth toy vehicles having caterpillar-like treads similar to a tractor or bulldozer.

While the foregoing described prior art devices have to some extent improved the art, and in some instances enjoyed commercial success, there remains nonetheless a continuing need in the art for evermore improved, interesting and entertaining stand-alone or handheld electronic game apparatus.

SUMMARY OF THE INVENTION

Accordingly, it is a general object of the present invention to provide an improved electronic game apparatus. It is a more particular object of the present invention to provide an improved electronic game apparatus suitable for playing a bulldozer game. It is a still more particular object of the present invention to provide an improved electronic bulldozer game apparatus having a moveable toy bulldozer model and scrolling travel image both of which are manipulated by the user in a driving style activity.

In accordance with the present invention there is provided an electronic game comprising: a housing having a pair of handles and a pivotable turntable and a model toy vehicle supported thereon; a pair of control levers supported by the handles, each control lever having a handle rod extending into the housing; a display supported by the housing having means for displaying a plurality of moveable images thereon including a toy vehicle image; a pair of switches activated by the pair of control levers; a control circuit coupled to the display and the pair of switches operative to scroll images on the display rearwardly relative to the model toy vehicle image when both of the control levers are simultaneously squeezed and to scroll images on the display to one side relative to the model toy vehicle image; and pivot means, coupled to the turntable and to the handle rods, for pivoting the turntable toward the left or right in response to squeezing of one or the other of the control levers while not pivoting the turntable when both of the control levers are squeezed.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 5 sets forth a section view of the present invention electronic bulldozer game taken along section lines 5—5 in FIG. 1;

FIG. 7 sets forth a block diagram of the microprocessor based control circuit utilized in the present invention electronic bulldozer game.

DESCRIPTION OF THE PREFERRED EMBODIMENT

Figure 1:
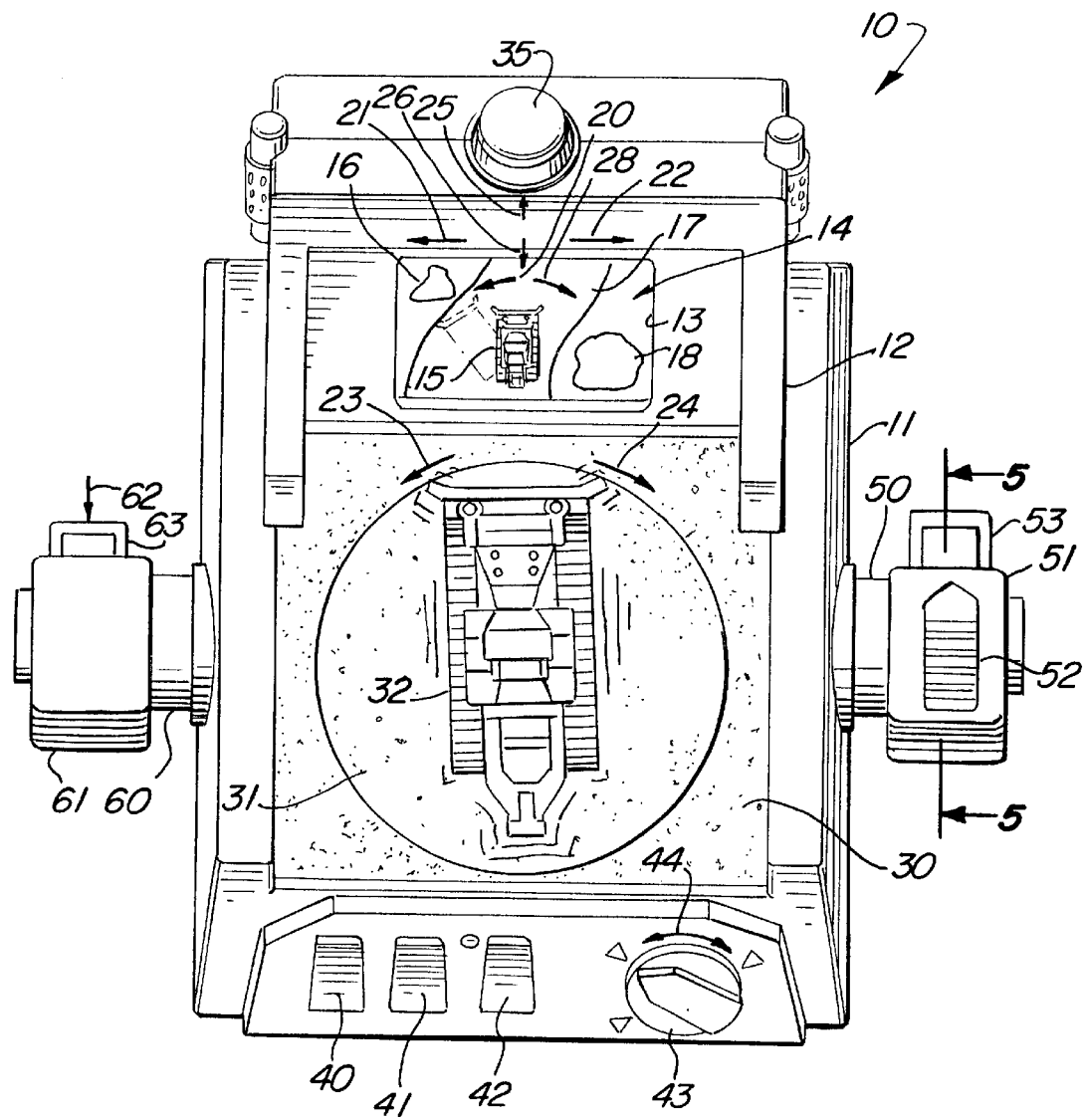
FIG. 1 sets forth a top perspective view of an electronic bulldozer game constructed in accordance with the present invention.

FIG. 1 sets forth a top perspective view of an electronic bulldozer game constructed in accordance with the present invention and generally referenced by numeral 10. Game 10 includes a housing 11 preferably formed of a molded plastic material or the like. Housing 11 supports an upward and forwardly display housing 12 which defines an aperture 13. A liquid crystal display 14 is supported within display housing 12 against aperture 13 so as to be viewable therethrough. Display housing 12 further supports a flashing light 35.

Housing 11 further defines a generally horizontal play surface 30 which in turn supports a pivotable turntable 31. A miniature replica or model of a bulldozer 32 is secured to turntable 31. Housing 11 further supports a horizontally extending post 50 which in turn supports a control handle 51. Control handle 51 further supports a moveable control lever 53 and a reverse button 52. Housing 11 further includes a horizontally extending post 60 generally aligned with post 50 which supports a control handle 61 having a moveable control lever 63 supported therein. Control handles 51 and 61 are sized and configured to form hand grips of the type characteristic of the control apparatus of a conventional bulldozer. Similarly, control levers 53 and 63 are configured for response to the user holding control handles 51 and 61 for simultaneous grasp of control levers 53 and 63. For purposes of illustration, control lever 53 is shown in its fully extended position while control lever 63 is shown in its inwardly pivoted having been squeezed by a user gripping handle 61 so as to move control lever 63 inwardly in the direction indicated by arrow 62.

Housing 11 further supports a plurality of user operated buttons 40, 41 and 42. In the preferred fabrication of the present invention electronic bulldozer game button 40 provides selection of sound mode while button 41 provides selection of a desired game play. Button 42 provides a pause button which temporarily stops game play. Housing 11 further supports an engine on/off and engine start button 43. Button 43 is rotatable in the manner indicated by arrows 44.

Display 14 is preferably fabricated of a liquid crystal (LCD) apparatus and shows a number of image objects thereon. In accordance with the preferred fabrication of the present invention, display 14 displays an image 15 which corresponds to the appearance of model bulldozer 32. In addition, display 14 shows a plurality of image objects utilized in game play such as a landscape object 16, a tree 18 and a roadway 17.

In operation, the user initially performs and engine start by rotating engine on/off and engine start button 43 to trigger the generation of engine sound within game 10. In accordance with the preferred fabrication of the present invention a vibrating mechanism (seen in FIG. 6) is operated in combination with the generation of engine noise to vibrate turntable 31 and model bulldozer 32. This vibration is intended to provide a tactile feel and image to accompany the engine sound.

At the initiation of game play, bulldozer image 15 is shown in display 14 together with a plurality of image objects. The user manipulates bulldozer image 15 by gripping control handles 51 and 61 with each hand and thereafter initiating movement or turning or reverse direction travel by appropriate manipulation of control levers 53 and 63 as well as reverse button 52. The intended play pattern of game 10 is directed toward simulating the operation of a bulldozer. Accordingly, as the user squeezes control lever 63 alone in the direction indicated by arrow 62, a move in which a typical bulldozer would execute a left turn, apparatus within housing 11 set forth below in FIGS. 3 and 4 causes turntable 31 to be pivoted to the left in the direction indicated by arrow 23. Additionally, image object 15 corresponding to bulldozer 32 also undergoes an left turn movement upon display screen 14 in the manner indicated by arrow 20. In this combination of events, the user simultaneously sees the movement of bulldozer 32 and the response of bulldozer image object 15 executing the left turn. It will be apparent to those skilled in the art that should the user release control lever 63 and instead grip control lever 53 a right turn operation is executed in which turntable 31 and bulldozer 32 are pivoted in the direction indicated by arrow 24 while bulldozer image 15 is similarly pivoted in the direction indicated by arrow 28. In the absence of inward movement of either of control levers 53 or 63, bulldozer 32 and bulldozer image 15 face forwardly in a straight line relationship. In addition, when neither of control levers 53 or 63 are squeezed into control handles 51 or 61, no forward movement is depicted upon display 14.

When the user desires to drive bulldozer 32 forwardly, the user grips both control levers 53 and 63 simultaneously. This simultaneous squeezing of control levers 53 and 63 causes bulldozer 32 to remain pointed straight ahead while bulldozer image 15 upon display 14 is depicted as moving by scrolling the remaining objects within display 14 in the appropriate direction.

Figure 2:
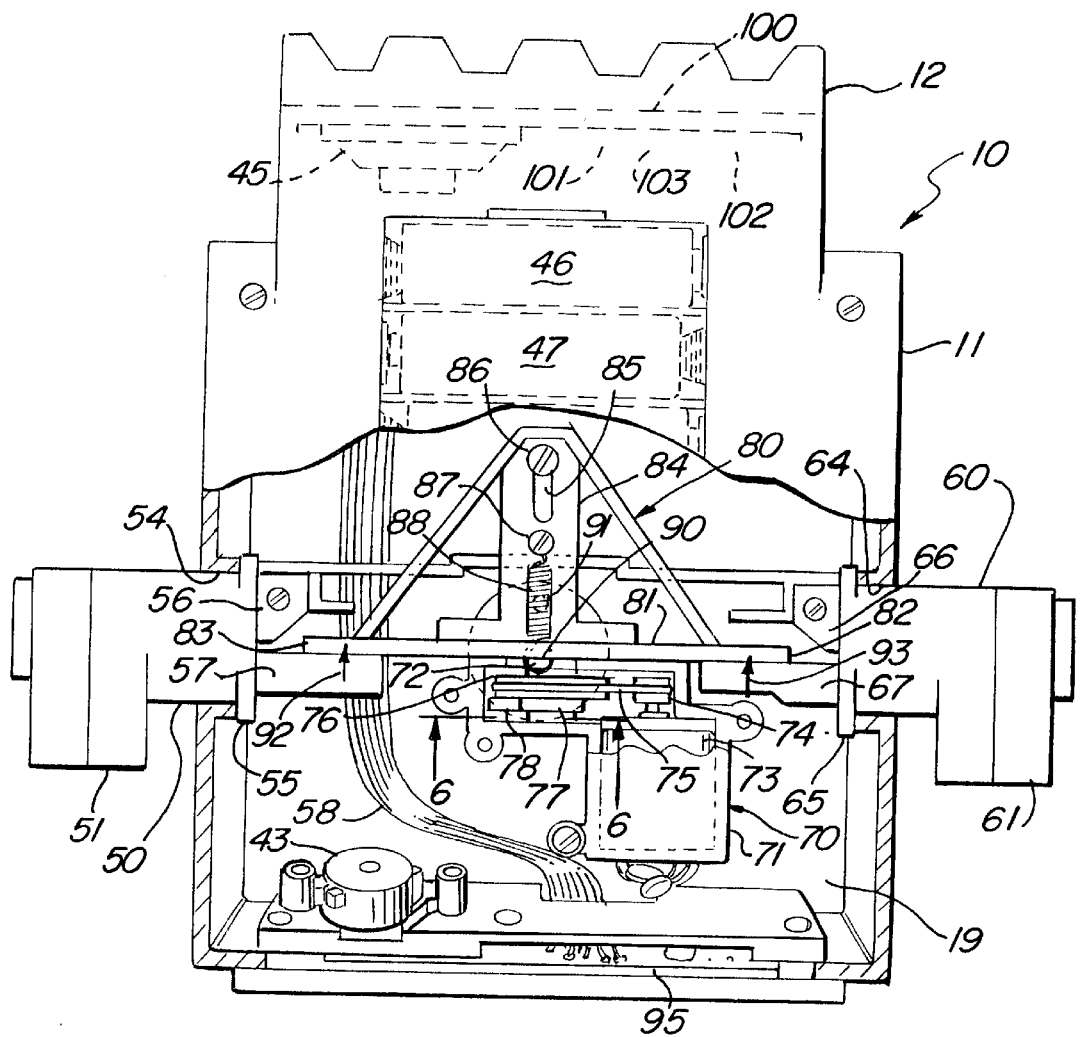
FIG. 2 sets forth a partially section bottom view of the present invention electronic bulldozer game.

FIG. 2 sets forth a partially sectioned bottom view of electronic game 10. As described above, electronic game 10 includes a housing 11 supporting a display housing 12 which in turn supports a display 14 (seen in FIG. 1) together with a speaker 45. Display housing 12 further supports a printed circuit board 100 having a digital electronic control circuit supported thereon. The digital electronic control circuit of game 10 is set forth below in FIG. 6 in greater detail. However, suffice it to note here that circuit board 100 supports a microprocessor 101 having an associated memory 103. Additional circuit components such as component 102 are further supported upon circuit board 100. Housing 11 further supports a battery power source comprised of a plurality of batteries such as batteries 46 and 47.

Housing 11 further defines a pair of apertures 54 and 64 on opposite sides of housing 11 in substantial alignment.

Housing 11 further defines a pair of apertures 54 and 64 on opposite sides of housing 11 in substantial alignment. Housing 54 receives post 50 having a flange 55 at one end and supporting a handle 51 at the outer end. Flange 55 is engaged by a clamp 56 which secures post 50 in a fixed attachment within aperture 54. A handle rod 57 extends inwardly from post 50 and, as is better seen in FIG. 5, is operatively coupled to control lever 53 (seen in FIG. 1).

Aperture 64 receives a post 60 having an internal flange 65 secured by a clamp 66. The outer end of post 60 supports a handle 61. As is better seen in FIG. 1, handle 6i further supports a control lever 63. A handle rod 67 extends inwardly through post 60 into interior cavity 19 of housing 11. Handle rods 57 and 67 are moveable forwardly in the directions indicated by arrows 92 and 93 when control levers 53 and 63 (seen in FIG. 1) are respectively squeezed.

A vibrator unit 70 includes a housing 71 secured within interior cavity 19 of housing 11. Vibrator 70 includes a motor 73 supported within housing 71 having an output pulley 74. Vibrator unit 70 further includes a pulley 76 and a plate 77 rotatably supported by housing 71. Plate 77 includes a tab 78 extending therefrom. A flexible belt 75 is received upon pulleys 74 and 76. Housing 71 further defines a tab 72.

A slider 80 having a generally triangular shape and supporting a cross bar 81 and a center plate 84 is received within interior cavity 19, Cross bar 81 defines end portions 82 and 83 positioned against handle rods 67 and 57 respectively. Center plate 84 of slider 80 defines a slot 85 which receives a post 86 therein. Slider 80 further supports a post 87 which receives one end of a coil spring 88. The remaining end of spring 88 is secured to tab 72 of vibrator unit housing 71. Center plate 84 is secured rigidly to cross bar 81 such that the force of spring 88 draws the entire structure of slider 80 such that ends 82 and 83 of cross bar 81 are forced against handle rods 67 and 57 respectively. Housing 11 further supports the above described plurality of controls including engine on/off and engine start switch 43. A circuit board 95 is supported upon housing 11 and provides coupling to a plurality of connecting wires 58. Connecting wires 58 make appropriate connections to batteries 46 and 47 as well as speaker 45 and circuit board 100.

Figure 6:
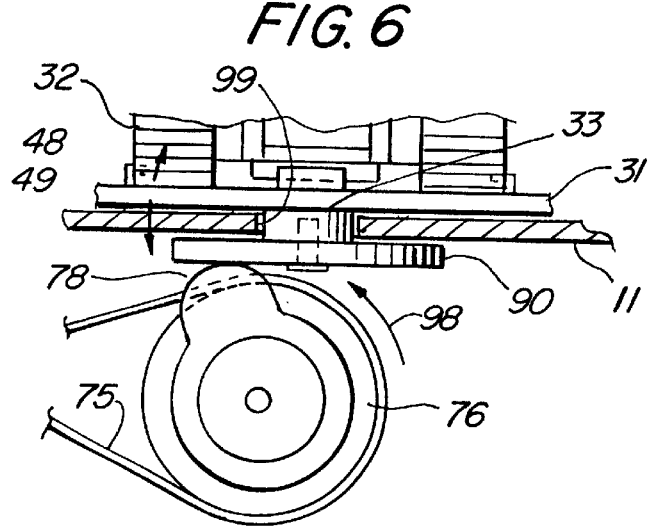
FIG. 6 sets forth a partial section view of the present invention electronic bulldozer game taken along section lines 6—6 in FIG. 2.

As is better seen in FIG. 6, turntable 31 is coupled to a wheel 90 which in turn supports a peg 91. The function of wheel 90 and peg 91 in cooperation with slider 80 is set forth below in FIGS. 3 and 4. However, suffice it to note here that center plate 84 defines a slot 110 (seen in FIG. 3) which receives peg 91 to provide an eccentric coupling between center plate 84 and wheel 90 and ultimately turntable 31.

In operation, each time the user squeezes either or both of control levers 53 and 63 (seen in FIG. 1), handle rods 57 and 67 are moved forwardly in the direction indicated by arrows 92 and 93. The movement of handle rods 57 and 67 forwardly displaces end portions 83 and 82 of cross bar 81. This forward movement is accommodated by slots 85 and 110 (seen in FIG. 3) and is resisted by spring 88. The cooperation of slider 80 and control levers 53 and 63 (seen in FIG. 1) together with wheel 90 and peg 91 provides pivotal movement of wheel 90 when either control lever is squeezed without the other. However, in the event both control levers are squeezed simultaneously, the result is a straight line forward movement of slider 80 without imparting any pivotal force to wheel 90. The operation of slider 80 in combination of wheel 90 and control levers 53 and 63 (seen in FIG. 1) is set forth below in FIGS. 3 and 4 in greater detail. Suffice it to note here that wheel 90 is moved to the left or to the right in response to movement of control levers 53 or 63 (seen in FIG. 1).

Figure 3:
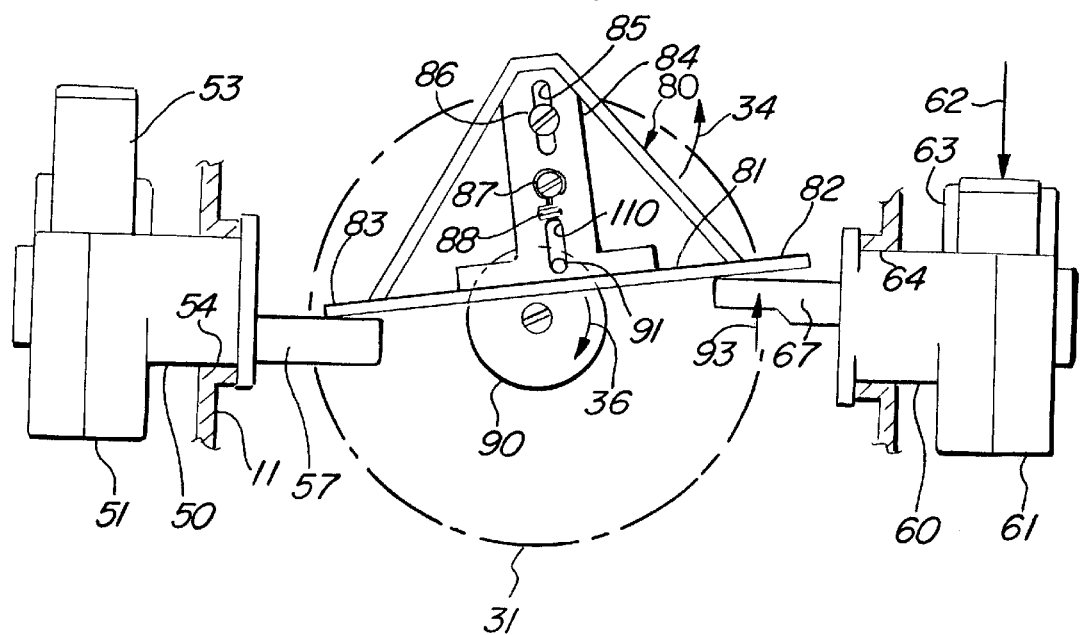
FIG. 3 sets forth a partial section view of the steering apparatus of the present invention electronic bulldozer game executing a left turn movement.
Figure 4:
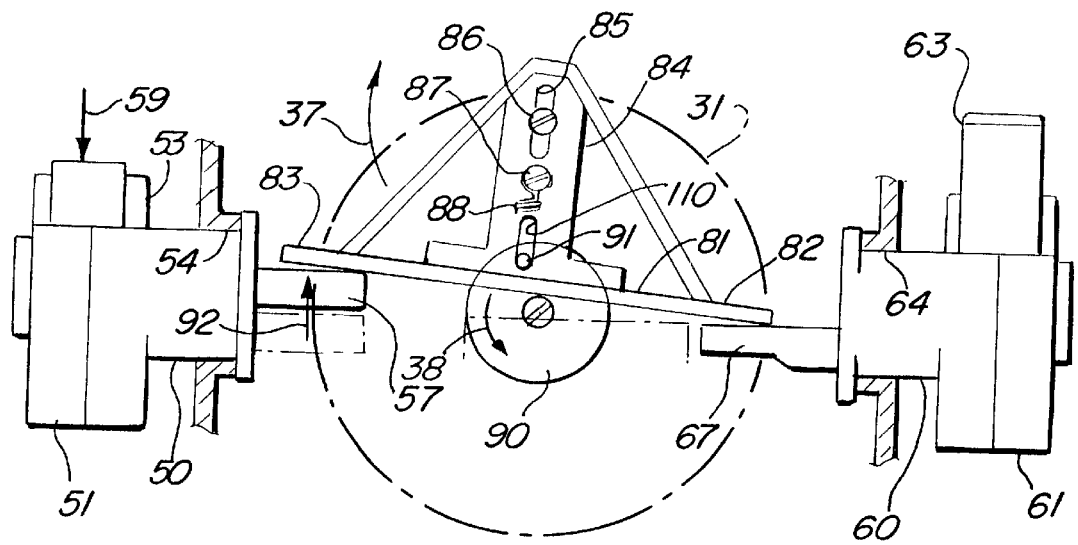
FIG. 4 sets forth a partial section view of the steering apparatus of FIG. 3 executing a right turn.

FIGS. 3 and 4 set forth simplified partial section views of the cooperation of handles 51 and 61 together with slider 80 to affect pivotal movement of turntable 31.

More specifically, housing 11 finds a pair of apertures 54 and 64 supporting respective posts 50 and 60. Post 50 supports a handle 51 having a control lever 53 while post 60 supports a handle 61 having a control lever 63 supported therein. Turntable 31 (better seen in FIG. 1) is supported by a wheel 90 having a peg 91 extending therefrom. A slider 80 includes a center plate 84 and a cross bar 81. Cross bar 81 defines ends 82 and 83 while center plate 84 defines slots 85 and 110. A post 86 is received within slot 85 to guide the movement of slider 80 while peg 91 of wheel 90 is received within slot 110. Center plate 84 further supports a post 84 which receives one end of a spring 88. Control levers 53 and 63 are operatively coupled to inwardly extending handle rods 57 and 67 respectively.

In the position shown in FIG. 3, slider 80 is pivoted in the direction indicated by arrow 34 as the user squeezes control lever 63 of handle 61 in the direction indicated by arrow 62. In the manner seen in FIG. 5, the squeezing of control lever 63 moves handle rod 67 forwardly in the direction indicated by arrow 93. The force thereby exerted upon end 82 of cross bar 81 pivots slider 80 about post 86 against the force of spring 88. The pivoting movement of slider.80 and the coupling between slot 110, and peg 91 causes pivotal movement of wheel 90 and thereby turntable 31 in the direction indicated by arrow 36. When the force against control lever 63 is removed or released, the force of spring 88 returns slider 80 to the position shown in FIG. 2.

FIG. 4 sets forth the position of slider 80 and turntable 31 together with wheel 90 in response to the user squeezing control lever 53.

More specifically, housing 11 finds a pair of apertures 54 and 64 supporting respective posts 50 and 60. Post 50 supports a handle 51 having a control lever 53 while post 60 supports a handle 61 having a control lever 63 supported therein. Turntable 31 (better seen in FIG. 1) is supported by a wheel 90 having a peg 91 extending therefrom. A slider 80 includes a center plate 84 and a cross bar 81. Cross bar 81 defines ends 82 and 83 while center plate 84 defines slots 85 and 110. A post 86 is received within slot 85 to guide the movement of slider 80 while peg 91 of wheel 90 is received within slot 110. Center plate 84 further supports a post 84 which receives one end of a spring 88. Control levers 53 and 63 are operatively coupled to inwardly extending handle rods 57 and 67 respectively.

In response to the movement of control lever 53 in the direction of arrow 59, handle rod 57 is moved in the direction indicated by arrow 92. This movement in turn pivots slider 80 in the direction indicated by arrow 37. The pivotal movement of slider 80 in turn pivots wheel 90 and turntable 31 in the direction indicated by arrow 38. Upon release of handle 53, spring 88 restores slider 80 to the straight line relationship shown in FIG. 2 returning turntable 31 to the straight line position shown in FIG. 1.

FIG. 5 sets forth a section view of control handle 51 taken along section lines 5—5 in FIG. 1. It will be noted that control handle 51 supports a reverse button 52 which is not repeated on control handle 61. It should be understood, that but for the use of reverse button 52 upon control handle 51, the structure set forth in FIG. 5 is identical to the structure of control handle 61. Accordingly. the structure shown in FIG. 5, (but for button 52) as well as the descriptions which accompany FIG. 5 will be understood to apply equally well and be equally by descriptive of control handle 61.

Control handle 51 defines an aperture 23, a pivot 120 and an aperture 127. A control lever 53 is pivotally secured at pivot 120 and includes an upper end extending outwardly through aperture 123 and a lower end supporting a handle rod 57. Handle rod 57 extends through 127 to contact cross bar 81 of slider 80 (seen in FIG. 4). Control lever 53 further includes a tab 121 having one end of a spring 124 coupled thereto. A flange 122 supports a switch 126 positioned within the travel path of tab 121 when control lever 53 is pivoted in the direction indicated by arrow 130. Handle 51 further supports a button 52 and a switch mechanism 125 supported in communication therewith. A plurality of connecting wires 129 and 128 operatively couple switch 125 and switch 126 to the remainder of the operational circuitry (not shown) of the present invention game.

In operation. in the relaxed position shown spring 124 pivots control handle 53 outwardly about pivot 120. When control lever 53 is squeezed inwardly however in the direction indicated by arrow 130, pivot rod 57 is forced against cross bar 81 of slider 80 in the direction indicated by arrow 131. Concurrently, the pivotal movement of control lever 53 causes tab 121 to close switch 126. Thus, each time control lever 53 is squeezed inwardly in the direction indicated by arrow 130, cross bar 81 is moved forwardly while simultaneously switch 126 is closed. Switch 126 provides an electrical signal condition for the control circuit shown in FIG. 7 to respond to the squeezing of control lever 53. Similarly, pressing button 52 provides actuation of switch mechanism 125 producing an additional signal input for the circuit of FIG. 7.

FIG. 6 sets forth a partial section view of the vibrating unit of the present invention electronic game taken along section lines 6—6 in FIG. 2. As described above, a pulley 76 is coupled by a belt 75 to pulley 74 of vibrator unit 70 (seen in FIG. 2). A plate 77 is joined to and rotatable with pulley 76 and includes an outwardly extending tab 78. Housing 11 defines an aperture 99 which receives a post 33 in a relatively loose fit. Post 33 is joined to wheel 90 beneath the surface of housing 11 while the upper end of post 33 is joined to turntable 31. Turntable 31 supports bulldozer 32 in the manner shown in FIG. 1.

In operation, when vibrator unit 70 (seen in FIG. 1) is energized, pulley 76 is rotated in the direction indicated by arrow 98. This rotation in turn rotates plate 77 causing tab 78 to repeatedly impact one side of wheel 90. The off-center impacts of tab 78 against wheel 90 cause the combined structure of wheel 90, post 33, turntable 31 and bulldozer 32 to be repeatedly vibrated in the directions indicated by arrows 48 and 49. In the preferred fabrication of the present invention, vibrator unit 70 (seen in FIG. 2) is operated concurrently with the generation of engine sound.

FIG. 7 sets forth a block diagram of the operative control circuit within game 10. In the preferred fabrication of the present invention, the control circuit utilized is a microprocessor based digital electronic circuit having a microprocessor 101 and a memory 103. Microprocessor 101 is coupled to inputs received from switches 126 and 136 operated by control levers 53 and 63 of handles 51 and 61 respectively (seen in FIG. 1). Microprocessor 101 further responds to a plurality of switches 40, 41, 42 and 43 together with a reverse switch 125.

Microprocessor 101 operates under a stored instruction set within memory 103 to perform the functional operation of the present invention game. Microprocessor 101 includes a plurality of outputs coupled to a vibrator unit 70, a sound circuit 115, and a display driver 116. Vibrator unit 170 is described above, while sound circuit 115 may be entirely conventional in fabrication. Sound circuit 115 operates in response to signals provided by microprocessor 101 to produce audio signals suitable for driving speaker 45.

Display driver 116 receives digitally encoded display signals from microprocessor 101 which are constructed in response to the various switch inputs to microprocessor 101 under the direction of stored instruction game set within memory 103. Display driver 116 is conventional in fabrication and provides appropriate matrixed display signals for liquid crystal display 14.

The electronic bulldozer game set forth herein provides a novel and amusing game which simultaneously responds to control inputs by the user via a pair of control handles and control levers to move a turntable supported model bulldozer and to move a bulldozer image element upon a display in a scrolling movement.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An electronic game comprising:
   a housing having a pair of handles and a pivotable turntable and a model toy vehicle supported thereon;
   a pair of control levers supported by said handles, each control lever having a handle rod extending into said housing;
   a display supported by said housing having means for displaying a plurality of moveable images thereon including a toy vehicle image;

a pair of switches activated by said pair of control levers;

a control circuit coupled to said display and said pair of switches operative to scroll images on said display rearwardly relative to said model toy vehicle image when both of said control levers are simultaneously squeezed and to scroll images on said display to one side relative to said model toy vehicle image; and pivot means, coupled to said turntable and to said handle rods, for pivoting said turntable toward the left or right in response to squeezing of one or the other of said control levers while not pivoting said turntable when both of said control levers are squeezed.

* * * * *